Nov. 19, 1957     A. C. BRUNO     2,813,509
ANIMAL FEEDING DEVICE
Filed Aug. 28, 1956     2 Sheets-Sheet 1
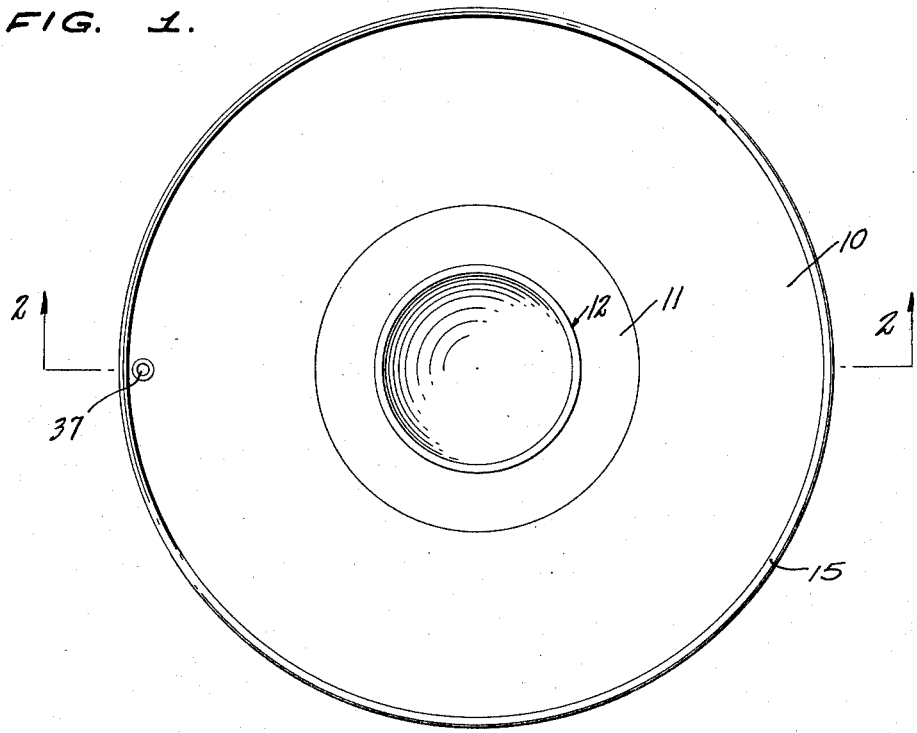
FIG. 1.
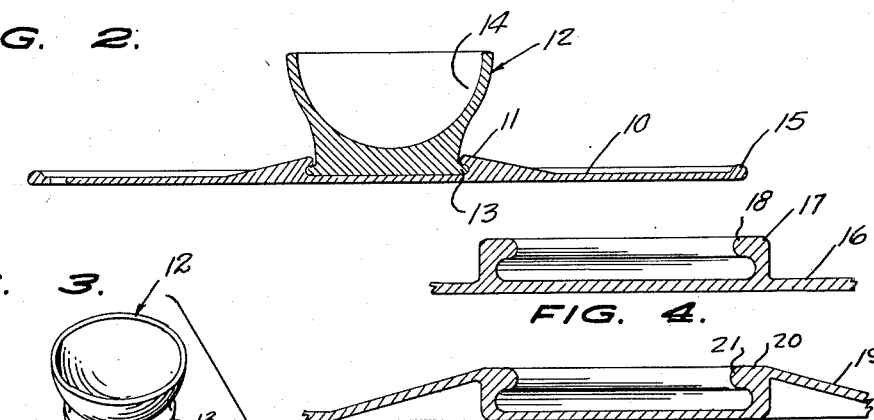
FIG. 2.
FIG. 4.
FIG. 5.
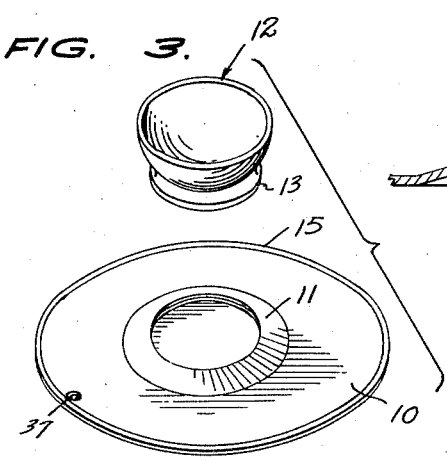
FIG. 3.
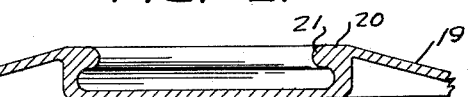
INVENTOR.
AUGUST C. BRUNO,
BY
McMorrow, Berman & Davidson
ATTORNEYS.

Nov. 19, 1957 A. C. BRUNO 2,813,509
ANIMAL FEEDING DEVICE
Filed Aug. 28, 1956 2 Sheets-Sheet 2

INVENTOR.
AUGUST C. BRUNO,
BY
McMorrow, Berman & Davidson
ATTORNEYS.

# United States Patent Office 2,813,509
Patented Nov. 19, 1957

2,813,509

ANIMAL FEEDING DEVICE

August C. Bruno, Greenwich, Conn.

Application August 28, 1956, Serial No. 606,612

3 Claims. (Cl. 119—51)

The present invention relates to an animal feeding device generally and in particular to a combination bowl and mat which is designed to be anchored by the feeding animal in a stationary position so as to prevent movement of the feeder and the overturning thereof.

An object of the present invention is to provide an animal feeding device which lends itself to the feeding of animals within the home without the overturning of the feeding device upon the floor of the home by the animal, one which may be readily cleaned and sterilized, one which is neat and attractive in appearance and may be economically manufactured in quantity, and one which may be rolled up when not in use for storage in a convenient place.

These and other objects and advantages of the present invention will be fully apparent from the following description, when taken in connection with the annexed drawings, in which:

Figure 1 is a plan view of the animal feeding device according to the present invention;

Figure 2 is a sectional view taken on the line 2—2 of Figure 1;

Figure 3 is an exploded perspective view of the animal feeding device according to the present invention;

Figure 4 is a fragmentary sectional view, on an enlarged scale, of a modified form of the device of the present invention;

Figure 5 is a fragmentary sectional view, on an enlarged scale, of a further modified form of the device of the present invention;

Figure 6:
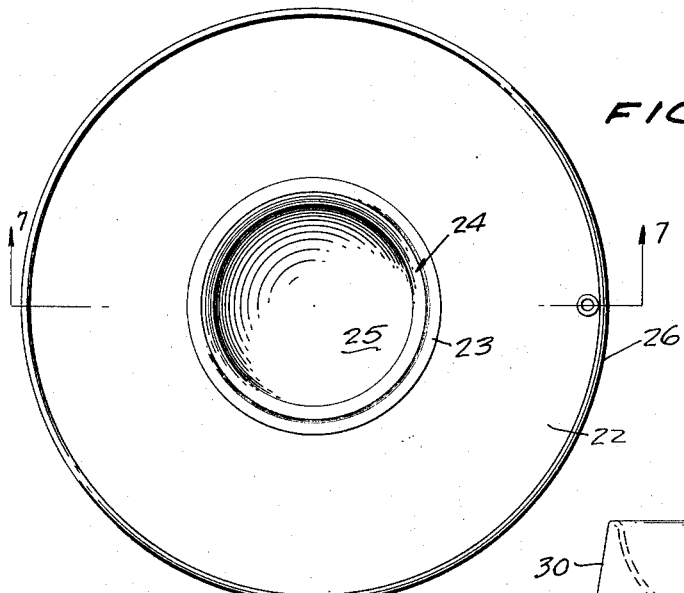
Figure 6 is a plan view of still another modified form of the animal feeding device of the present invention.

Referring in greater detail to the drawings, in which like numerals indicate like parts throughout the several views, the animal feeding device of the present invention comprises, in a first embodiment shown in Figures 1 to 3, inclusive, a substantially flat sheet-like mat 10 fabricated of relatively flexible material such as sheet rubber, plastic, or the like, and having a flat under surface adapted to rest upon a supporting surface such as a floor.

The mat 10, although here shown circular in form, may be of any shape desired. An upstanding skirt 11 is positioned medially of the mat 10 and is formed integrally therewith, as shown most clearly in the sectional view, Figure 2.

An open top receptacle 12 is positioned within the skirt 11, the receptacle 12 having a base 13 and a bowl 14 carried by the base 13. In the assembled position shown in Figures 1 and 2, the base 13 of the receptacle 12 is detachably embraced by the skirt 11. A rim 15 rises from the periphery of the mat 10 and serves to keep any spilled food or liquid from reaching the supporting surface on which the mat 10 is placed.

In the modified form of the invention shown in Figure 4, the mat 16 has a vertically extending skirt 17 provided with an inwardly turned lip 18 for embracingly receiving the base 13 of the receptacle 12.

In the form of the invention shown in Figure 5, the portion of the mat 19 immediately adjacent the skirt 20 slopes upwardly. The skirt 20 is provided with an inwardly extending rim or lip 21 which engages the receptacle 12 above its base 13 in the same manner, as above described, with reference to the forms of the invention shown in Figures 1 to 3, inclusive, and in Figure 4.

Figure 7:
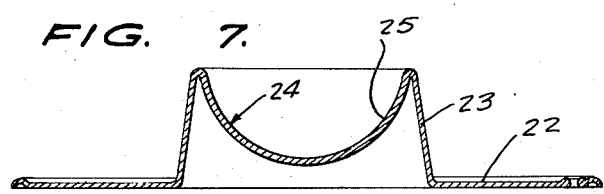
Figure 7 is a fragmentary sectional view taken on the line 7—7 of Figure 6.

In Figures 6 and 7, a further form of the animal feeding device of the present invention is shown in which the mat 22 again has a flat under surface and an upstanding skirt 23 positioned medially of the mat 22. In this form of the invention the receptacle, indicated generally by the reference numeral 24 comprises a bowl 25 positioned within the skirt 23 and having its perimeter integrally formed with the upper end of the skirt 23. An upstanding rim 26 extends about the perimeter of the mat 22 and serves to retain on the mat 22 any spilled food or liquid.

Figure 8:
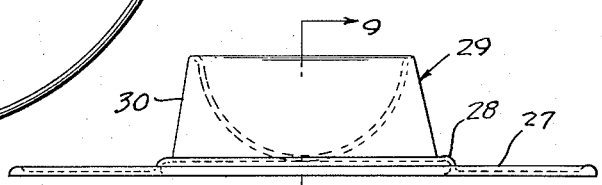
Figure 8 is an elevational view of a further form of the present invention.
Figure 9:
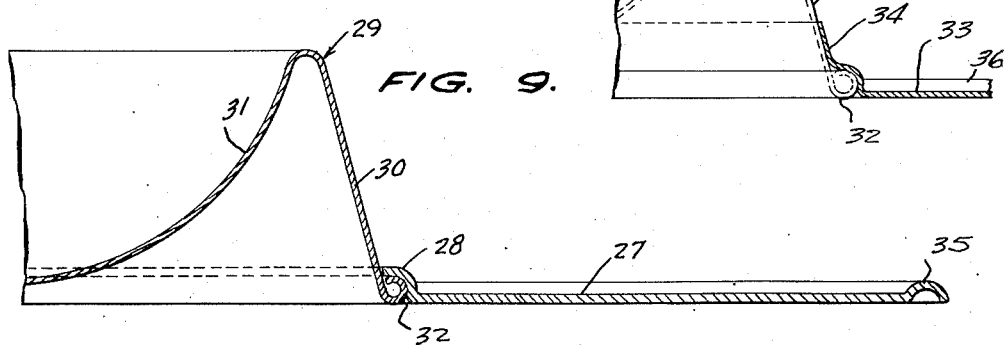
Figure 9 is a sectional view, on an enlarged scale, taken on the line 9—9 of Figure 8.

In Figures 8 and 9, is shown another modification of the animal feeding device of the present invention in which the mat 27 again has a flat under surface and an upstanding skirt 28 positioned medially of the mat 27. The receptacle 29, in this form of the invention, comprises an upstanding endless wall 30 and a bowl 31 positioned within the wall 30 and dependingly supported by the wall 30. A bead 32 extends exteriorly of and about the lower end of the wall 30. When the receptacle 29 and the mat 27 are in their assembled position, the skirt 28 detachably embraces the bead 32 and the adjacent portion of the wall 30, as seen most clearly in Figure 9.

Figure 10:
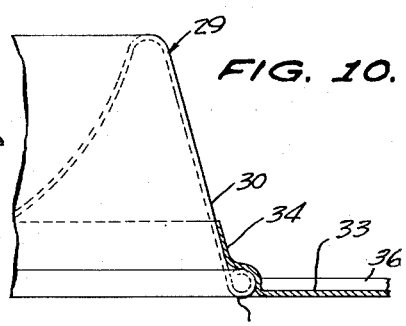
Figure 10 is a fragmentary view partially in section of still another form of the feeding device of the present invention.
Figure 11:
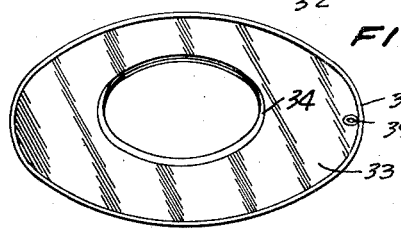
Figure 11 is a perspective view, on a reduced scale, of the form of the invention shown in Figure 10.

In Figures 10 and 11, the mat 32 has its skirt of a greater heighth than in the form of the invention shown in Figures 8 and 9, the skirt being indicated by the reference numeral 34 and when the receptacle 29 and the mat 33 are in the assembled position, the skirt 34 resiliently embraces both the bead 32 and the adjacent lower end portion of the wall 30 of the receptacle.

The mats 27 and 33 have upstanding rims 35 and 36, respectively, extending around their perimeters for the retention thereon of any food or liquid spilled on the mat from the receptacle 29.

The mats in each of the forms of the invention above described are provided with holes adjacent their respective rims by means of which the mats may be hung upon a suitable hook in the area of storage, the holes being shown at 37, 38, and 39 in Figures 1, 6, and 11.

It is an important feature of the invention, in each of its modifications, that the mat be of a diameter or size sufficiently greater than the diameter of the receptacle with which it is used or with which it is formed integrally that the animal feeding from the receptacle necessarily has his forepaws or feet on the upper surface of the mat between the rim and the receptacle. This will anchor the animal feeding device against movement and will enable the animal to thoroughly clean the contents of the receptacle.

It is intended that the receptacles 12 and 29 be formed of a rigid material such as lightweight metal, plastic, or the like, and that the portions of the receptacle walls which engage the skirts of the mats be of slightly greater diameter than the skirts of the mats so that a tight fit of the skirts upon the receptacle wall portions and beads be assured and thereby be virtually leakproof of any food which might be spilled upon the wall of the receptacle.

This application is a continuation-in-part of application No. 578,056, filed April 13, 1956, now abandoned.

What is claimed is:

1. An animal feeding device comprising a substantially flat sheet-like mat having a flat under surface adapted to rest upon a supporting surface, an upstanding skirt positioned medially of said mat and carried by the latter, an open top receptacle, said receptacle having a lower portion detachably connected to said skirt.

2. The device, according to claim 1, in which the receptacle comprises a base and a bowl carried by said base, said base being detachably embraced by said skirt.

3. The device, according to claim 1, in which the receptacle comprises an upstanding endless wall, a bowl positioned within said wall and dependingly supported from said wall, and a bead extending exteriorly of and about the lower end of said wall, said bead and the adjacent portion of said wall being detachably embraced by said skirt.

References Cited in the file of this patent

UNITED STATES PATENTS

| | | |
|---|---|---|
| 491,702 | Felix | Feb. 14, 1893 |
| 2,280,410 | Keltner | Apr. 21, 1942 |
| 2,592,638 | Andrew | Apr. 15, 1952 |
| 2,708,421 | Jauch | May 17, 1955 |
| 2,736,128 | Conyers | Feb. 28, 1956 |

FOREIGN PATENTS

| | | |
|---|---|---|
| 707,192 | Great Britain | Apr. 14, 1954 |